Aug. 2, 1932.  W. N. DAVIS ET AL  1,869,885
METHOD OF MAKING MOTOR FUEL
Filed Nov. 30, 1927   9 Sheets-Sheet 9

Inventors
William N. Davis
William H. Hampton
By Lyon & Lyon
Attorneys

Patented Aug. 2, 1932

1,869,885

UNITED STATES PATENT OFFICE

WILLIAM N. DAVIS, OF OAKLAND, AND WILLIAM H. HAMPTON, OF BERKELEY, CALIFORNIA, ASSIGNORS TO STANDARD OIL COMPANY OF CALIFORNIA, OF SAN FRANCISCO, CALIFORNIA, A CORPORATION OF DELAWARE

METHOD OF MAKING MOTOR FUEL

Application filed November 30, 1927. Serial No. 236,689.

This invention relates to a process of removing sulphur bodies from motor fuel and has particular value for treating cracked petroleum naphthas high in sulphur content and containing a relatively large percent of unsaturated hydrocarbons.

Cracked naphtha contains a much larger percentage of unsaturated hydrocarbons than ordinary gasoline or motor fuel obtained by the straight run or conventional distillation at atmospheric pressure from crude petroleum and the like. In straight run gasoline the amount of unsaturated hydrocarbons which accompanies the saturated hydrocarbons varies with the type of oil employed, and may run from little or no unsaturated content, as with paraffine base oils, to from 4 to 6% or more, as with asphaltic base oils. In cracked naphthas the amount of unsaturates is much higher when produced from either paraffine or asphaltic base oils, and usually runs above 20%, depending upon the cracking conditions. These unsaturated hydrocarbons are considered to have superior anti-knock or anti-detonating value as compared with saturated hydrocarbons, and as such are particularly desirable constituents of motor fuel, especially for use in high compression motors.

A part of the unsaturated hydrocarbons present in cracked naphtha are sulphur bearing. Because of the injurious effect on metallic parts of internal combustion engines of acids formed from sulphur-bearing bodies, the sulphur content of the finished gasoline must be limited by the removal of such bodies during the making of the gasoline from oils having an excessive sulphur content. The method generally employed for removal of such sulphur bodies from cracked naphtha has been to treat the oil with sulphuric acid at the existing atmospheric conditions without regulation or control of the reaction temperature. During such treatment the sulphuric acid reacts with both the sulphur-bearing unsaturated hydrocarbons and the non-sulphur-bearing hydrocarbons in substantially the proportion in which the same exist in the oil. This reaction is exothermic and the temperature rise is substantially proportional to the amount of acid employed and is frequently as much as 100° F. The amount of acid used is determined by the sulphur content of the untreated naphtha, together with the desired sulphur content of the finished gasoline. After applying the acid the resulting sludge is removed and the oil washed and neutralized. The treated oil is then distilled to produce finished motor fuel or gasoline. The following results obtained with the conventional acid treatment illustrate the change in sulphur content of the motor fuel:

|  | No. 1 | No. 2 | No. 3 |
|---|---|---|---|
| Per cent of sulphur in raw naphtha | .60 | .78 | .78 |
| Per cent sulphur in treated naphtha before distillation | .56 | .79 | .78 |
| Per cent sulphur in finished gasoline (after distilling) | .16 | .196 | .15 |

It is evident that the reduction which takes place in the sulphur content of the naphtha by the conventional treatment, is brought about substantially entirely through conversion of sulphur-bearing bodies to higher boiling point bodies, so that when the treated oil is distilled a portion of the sulphur bodies remains with the still bottoms as high boiling point stock beyond the boiling point range of finished gasoline. When the acid treatment is performed under the conventional conditions the acid enters into combination not only with a part of the sulphur-bearing bodies, but also with a part of the non-sulphur-bearing bodies, thus removing a portion of both bodies from the oil in the resulting acid sludge. Inasmuch, however, as the treated naphtha bears practically the same percentage of sulphur as the untreated naphtha it is evident that with the treatment performed under conventional conditions non-sulphur-bearing bodies and sulphur-bearing bodies are attacked by the acid and removed in the sludge in substantially the proportions existing in the oil. The conversion of sulphur-bearing unsaturates to higher boiling point bodies is accompanied by a proportional conversion of non-sulphur-bearing unsaturates. During the subsequent distillation the non-sulphur-bearing unsaturates that have been converted to stock having a boiling point range beyond that of finished gasoline also remain in the still bottoms and there is a very material resultant loss in valuable gasoline constituents. This loss is known as the polymerization loss of valuable gasoline constituents due to acid treatment. This polymerization loss of valuable gasoline constituents will be increased as the amount of acid required to bring the sulphur content of the finished product to certain limits is increased. When treating cracked naphthas high in sulphur content, such as naphthas from certain California oils, so much acid is required that this polymerization loss of valuable non-sulphur-bearing unsaturates has exceeded 30%.

Since the advent of cracked gasoline the polymerization loss of valuable motor fuel constituents has been enormous, and manufacturers of cracked gasoline have been continually searching for a method of eliminating or reducing the polymerization loss of valuable gasoline constituents accompanying the removal of sulphur from the gasoline. Because this problem has not heretofore been successfully solved, it has been recently proposed that the limitations on the sulphur content of finished gasoline be raised in order that the specifications might be met without suffering so much polymerization loss of highly desirable motor fuel constituents. Because of the injurious effect to internal combustion engines, as confirmed by published research results of the country's leading motor car manufacturers, there is little likelihood of specifications being adopted which will permit of a materially higher sulphur content in motor fuel.

The object of the present invention is to provide a method of conducting the acid treatment of motor fuel to remove sulphur in such manner as will reduce or eliminate, as far as possible, the attendant loss of valuable motor fuel constituents.

With our invention we perform the acid treatment of motor fuel under such conditions that the acid does not act upon the sulphur-bearing bodies and the non-sulphur-bearing bodies merely in the same proportion as exist in the untreated oil, but acts relatively to a greater extent upon the sulphur-bearing bodies than on the non-sulphur-bearing bodies. This effects what may be termed a "selective action" bringing about a reduction in the sulphur content of the treated naphtha by removing with the acid sludge sulphur-bearing bodies in a proportion greater than that existing in the untreated naphtha, thereby reducing the amount of sulphur-bearing bodies to be removed through polymerization into stocks of higher boiling point range than that of the final gasoline. By thus reducing the sulphur content remaining to be removed by polymerization loss we enable the polymerization loss of the desirable unsaturated motor fuel ingredients to be reduced. This selective action is accomplished by limiting the maximum treating or reaction temperature. It is an incident of our process that with many but not all cracked naphthas a given amount of sulphur can be removed with less acid when certain reduced temperatures are employed with certain acids.

We have found that the polymerization loss of valuable motor fuel constituents occuring during the acid treatment to remove sulphur may be limited or controlled by limiting or controlling the maximum reaction or treating temperature. As the maximum reaction or treating temperature is reduced the polymerization loss of valuable motor fuel constituents is reduced. The maximum treating or reaction temperature to be employed for any given treatment will vary with the type of stock to be treated. The amount of cooling required to keep down the maximum treating temperature will depend substantially upon the amount of acid required to meet a given sulphur specification and is substantially proportional to the amount of sulphur to be removed and strength of the acid used. For example, we have found that with a cracked naphtha containing about .7% sulphur obtained from a typical California oil about ¾ lb. of 15% fuming acid per gallon of untreated naphtha is required for adequate desulfurization. When such an amount of fuming acid is used upon a gallon of the naphtha the heat evolved during the reaction is sufficient to raise the temperature of the mixture about 100° F. The manner by which the maximum treating or reaction temperature can best be limited to the desired point will primarily depend upon the amount of heat evolved by the reaction of the acid on the oil in any given treatment. The maximum treating or reaction temperature with oils low in sulphur and requiring relatively lighter acid treatment can be practically limited by reducing the initial temperature of the oil. With oils requiring relatively heavy acid treatment involving greater evolution of heat, it may be necessary to absorb a part of the heat of reaction by cooling the mixture during the reaction. The saving in valuable motor fuel constituents depends upon keeping down the maximum treating or reaction temperature and the selection of an initial temperature is important only as a means of in whole or in part determining the maximum temperature. The particular conditions of the treatment and the cost of refrigeration will determine in any given case the extent to which the maximum temperature can best be controlled by a selection of an initial temperature for the oil and by cooling during the reaction, or by a combination of the two.

We have found that by limiting the maximum treating or reaction temperature to produce a selective action of the acid with respect to the sulphur-bearing bodies in the oil, we remove the sulphur from the oil not merely by conversion or polymerization into stock of a boiling point range beyond that of the finished gasoline, but in part by removing the sulphur in the acid sludge in greater proportion than the sulphur bodies exist in the untreated oil. This is illustrated in the following examples stating comparative results that we have obtained with the conventional treatment and with our invention:

|  | Conventional acid treatment | Our method |
|---|---|---|
| Per cent of sulphur in untreated naphtha | .60 | .60 |
| Per cent of sulphur in treated naphtha before distillation | .56 | .25 |
| Per cent of sulphur in finished gasoline, i. e. after distillation | .16 | .14 |
| Polymerization loss of gasoline constituents | 13% | 5% |

That the reduction in the sulphur content of the oil is obtained not merely by conversion or polymerization but also by selective action of the acid by our process, is apparent from the foregoing examples by comparison of the drop from .60% to .25% after acid treatment and before distillation. This reduction in the sulphur by removal of a greater percentage of the sulphur-bearing bodies in the acid sludge than exist in the untreated fuel, is obtained by limiting the maximum treating or reaction temperature to below normal. That our method reduces the amount of sulphur to be removed through the formation of polymerized sulphur-bearing stock into material beyond the range of finished gasoline, is shown by the reduction of sulphur from .25% to .14% upon distillation, as compared with a drop from .56% to .16% by the old method. In other words, by our invention the reduction in sulphur has been made to take place in two steps; one by the formation of sludge containing a greater percentage of sulphur-bearing bodies than exist in the untreated fuel, and the other by the formation of polymerized material, whereas by the old method substantially the entire reduction in the percent of sulphur is accomplished through the formation of polymerized material which remains in the still bottoms. Since the treating loss (not polymerization loss) of the gasoline, i. e. the amount of reduction of valuable gasoline constituents caused by the combination of the acid with the oil, and the consequent removal of the reaction products through the resulting acid sludge is substantially the same with our new and improved method, as is experienced with the prior conventional methods (this treating loss not being shown in the above tabulation), and since the percentage of sulphur in the oil treated by our method (taken before distillation) is materially lower than in the raw or untreated stock, it follows that at the reduced maximum treating or reaction temperature employed according to our invention, the acid acts relatively to a greater extent on the sulphur bearing constituents and to a less extent on the non-sulphur bearing constituents than in the prior conventional method of treatment.

Our invention may be further understood by reference to the following specific illustrations of treatments conducted by practicing our invention; it being understood that our invention is not limited to the particular details of such treatments which are given by way of example as illustrating the results that may be obtained with our invention in treating different oils with different acids to obtain various results:

In the accompanying drawings Fig. 1 is a diagrammatical view of an apparatus suitable for conducting an acid treatment in accordance with our invention by a batch method employing an internal cooling coil.

Figure 1:
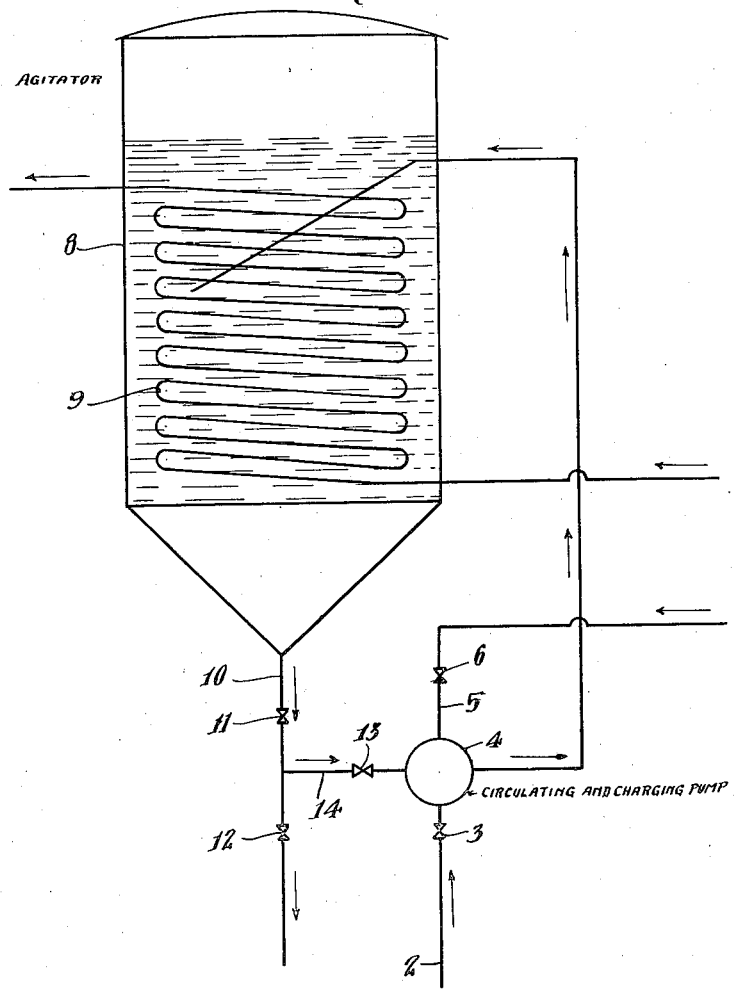

Referring to Fig. 1 of the accompanying drawings, the oil to be treated enters through the line 2, controlled by a valve 3 and is mixed by a pump 4 with the acid entering through a line 5 controlled by valve 6. The mixture of oil and acid is passed by a line to an agitator 8. The mixture in the agitator 8 is cooled by means of an internal cooling coil 9, and is discharged through a line 10, controlled by valves 11 and 12. The apparatus illustrated in Fig. 1 is adapted primarily for a batch operation and during the time that the acid and oil are being fed, the valve 13, controlling circulating line 14, connecting the discharge line 10 and the pump 4, is closed. After the charge is made up the valves 3 and 6 controlling the intake lines 2 and 5 and the valve 12 controlling the discharge line 10, are closed. The valve 11 and the discharge line 10 and the valve 13 in the circulating line 14 are opened, and the pump 4 is operated to circulate and agitate the mixture until the reaction is completed. The valve 13 in the circulating line 14 is then closed and the valve 12 in the discharge line 10 is then opened to discharge the agitator 8. By holding the mixture in the agitator 8 for a sufficient time after the shut-down of the circulating pump 4, the sludge may be permitted to settle out of the mixture in the agitator 8 and may be first drawn therefrom or the mixture may be drawn from the agitator 8 before the sludge has settled and the separation made outside of the agitator. The temperature of the oil to be treated may be reduced prior to mixture with the acid either before the oil is fed to the charging pump 4 or by circulation through the agitator 8 prior to feeding the acid. The cooling coil 9 may function to absorb heat from the mixture during the reaction of the acid on the oil. The extent and manner of limiting the maximum treating or reaction temperature of the mixture may be that selected to meet the particular conditions of the treatment as above stated and hereinafter more fully illustrated.

Figure 2:
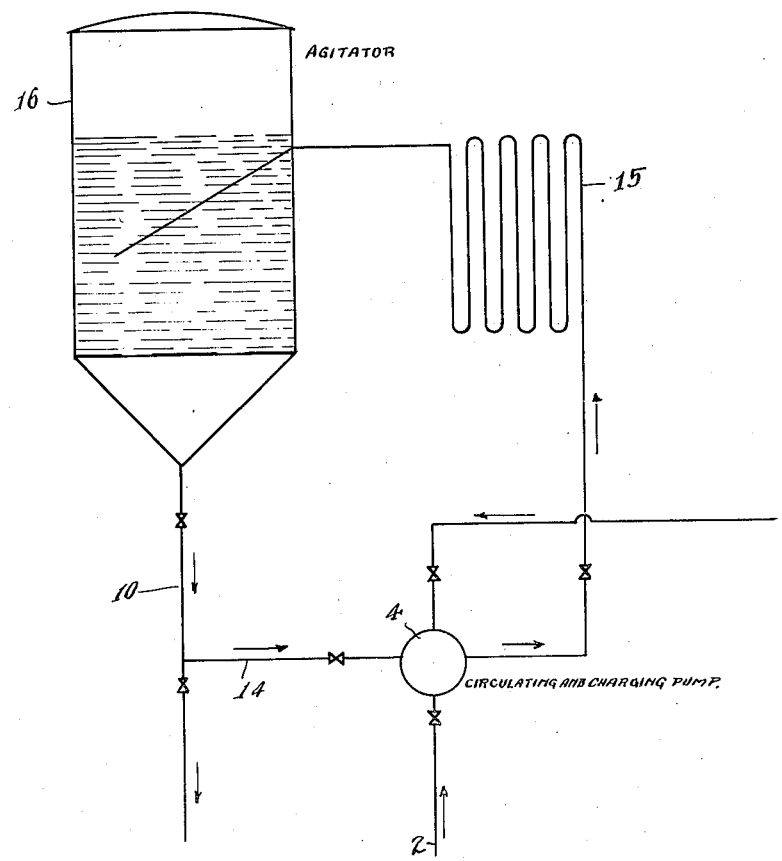
Fig. 2 is a diagrammatical view of an apparatus suitable for conducting an acid treatment in accordance with our invention by a batch method employing an external cooling coil.

The apparatus illustrated in Fig. 2 differs from that illustrated in Fig. 1 only in that the cooling coil 15 is positioned outside of the agitator 16 and the apparatus is susceptible of the same variety of operation and manipulations as that illustrated in Fig. 1.

Figure 3:
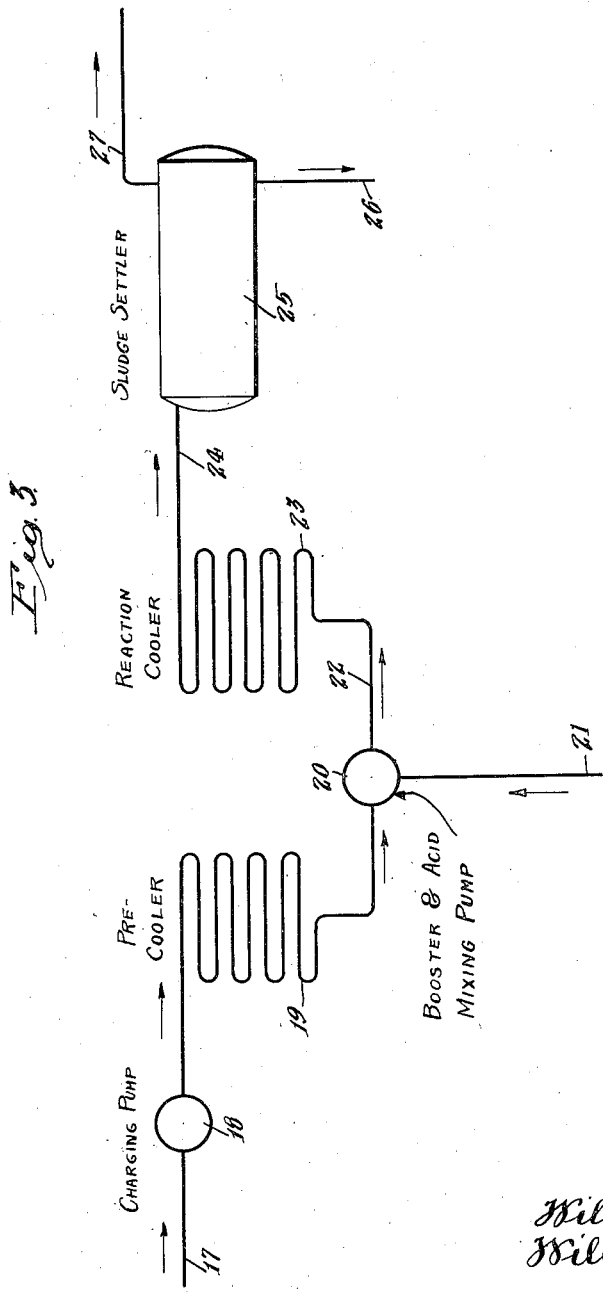
Fig. 3 is a diagrammatical view of an apparatus suitable for conducting an acid treatment in accordance with our invention by the use of a continuous con-flow process.

Referring to Fig. 3 of the attached drawings, the oil to be treated is passed through a line 17 to a charging pump 18 and from that pump through pre-cooler 19 to a mixing pump 20. Acid is passed to the mixing pump 20 through an inlet 21 and the mixture passes from the pump 20 through line 22 to a reaction cooler 23. From the reaction cooler 23 the mixture passes through a line 24 to a settling chamber 25 for separation of the resultant sludge. From the chamber 25 the sludge is discharged through an outlet 26 and the treated oil is discharged through an outlet 27. This arrangement is intended primarily for a continuous con-flow operation in which the oil is cooled in the pre-cooler 19 prior to mixture with the acid at the pump 20 and the mixture is subsequently cooled in the reaction cooler 23. The employment of the pre-cooler 19 to reduce the temperature of the oil before mixing with the acid and the reaction cooler 23 to absorb heat from the mixture during the reaction, enables the selection of an initial temperature and the absorption of heat during the reaction to be used in combination as the means or manner of limiting the maximum treating or reaction temperature. By employing multiple stage cooling the desired final treating or reaction temperature may be maintained without the necessity of cooling at any stage to as low a degree of temperature as would otherwise be necessary, and as the cost of cooling per degree of temperature increases as the temperature is lowered, multiple stage cooling reduces the cost of the operation. The initial temperature obtained in the pre-cooler 19 and the amount of heat absorbed in the reaction cooler 23 may be varied to meet the conditions of the operation and either stage of the cooling may be eliminated or relatively increased or decreased as the operating conditions require.

Figure 4:
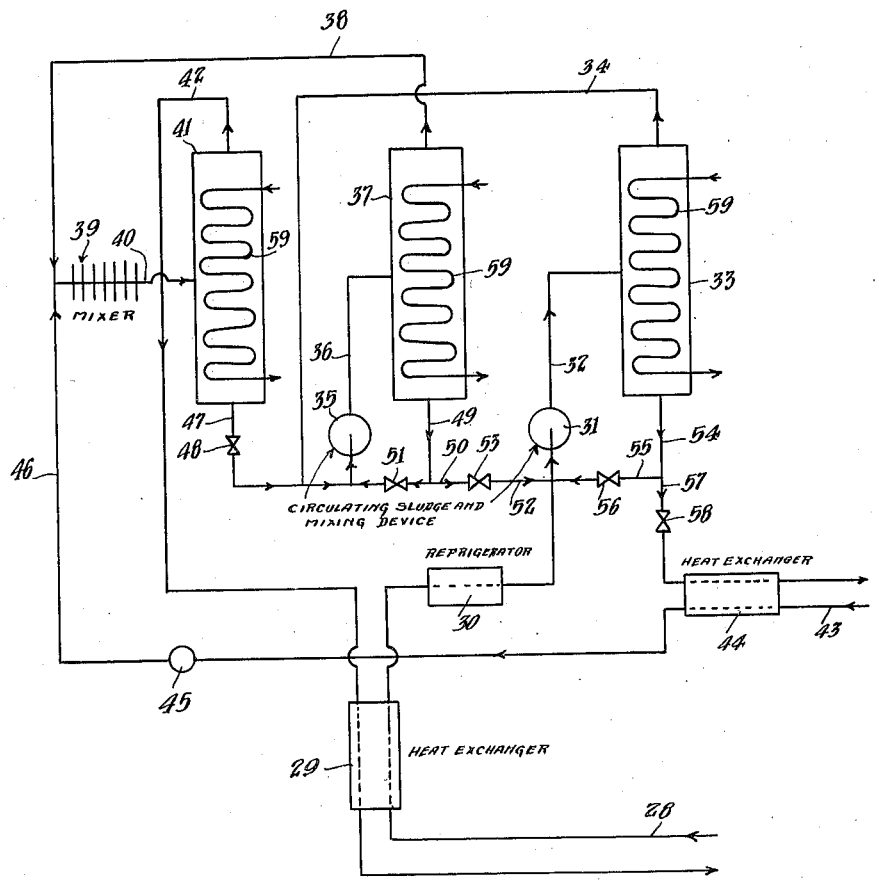
Fig. 4 is a diagrammatical view of an apparatus suitable for conducting an acid treatment in accordance with our invention by the use of a continuous counter-flow process.

Referring to the apparatus illustrated in Fig. 4, 28 indicates an intake line for the untreated oil leaving first through a heat exchanger 29 and next through a refrigerator 30 and to a circulating and mixing pump 31. A line 32 leads from the pump 31 and connects with the treating vessel 33 near the center of the vessel. Line 34 leads from the vessel 33 and connects with an additional circulating and mixing pump 35. A line 36 leads from the pump 35 and communicates with an additional treating vessel 37 near its center. A line 38 leads from the top of the treating vessel 37 and connects with a mixer 39, in turn connected by a line 40 with the center of a third treating vessel 41. A line 42 leads from the upper end of the treating vessel 41 through the heat exchanger 29 to discharge the treated stock. 43 indicates an intake line for the acid passing first through a heat exchanger 44 and then to a pump 45, the outlet end of which is connected by a line 46 to the mixing device 39 in order that the acid may pass together with the material from the line 38 through the mixing device 39 and first into the center of the treating vessel 41. The bottom of the treating vessel 41 is connected by a line 47 controlled by a valve 48 with an inlet end of a pump 35. The bottom of the treater 37 is connected by a line 49 with both a line 50 controlled by a valve 51 connected to the inlet of the pump 35, and to a line 52 controlled by a valve 53 and connected to the inlet end of the pump 31. The treating vessel 33 is connected at its lower end by a line 54 connected both by a line 55 controlled by a valve 56 with the inlet end of the pump 31, and by a line 57 controlled by a valve 58 with the heat exchanger 44, and from there discharges the spent acid. The treating vessels 33, 37 and 41 are provided with internal cooling coils 59. In operation the untreated oil enters through the line 28 and passes through the heat exchanger 29 and refrigerator 30 to the first treating vessel 33, entering the vessel near its center. Above the point at which the oil enters the vessel 33 the untreated oil will settle from the sludge supplied thereto, and is continuously drawn off through the line 34 and passed through the pump 35 into the center of the treating vessel 37. Likewise the oil is then drawn from the top of the vessel 37 and passed through a line 38 through a mixing device 39 into the third treating vessel 41. From the top of the treating vessel 41 the oil is withdrawn through the line 42 and passes through the heat exchanger 29 and is discharged from the apparatus. The acid passes through the heat exchanger 44 into the mixer 39 where it is mixed with the stock passing through the line 38 to the treating vessel 41. It will thus be seen that the fresh acid comes into contact with the most-treated oil. In the treating vessel 41 the partially-spent acid settles to the bottom where it is drawn off through line 47 and passes together with the oil in line 34 into the inlet end of the pump 35 from which the mixed oil and acid pass into the center of the treating vessel 37. In the treating vessel 37 the acid, being further spent than in treating vessel 41, settles to the bottom where it is drawn off through the line 49. Preferably part of the acid is passed through the line 49 into the inlet end of the pump 35 in order that part of the oil may be recirculated through the treating vessel 37. The remainder of the acid passes through a line 52 through the pump 31 entering together with the fresh oil into the center of the treating vessel 33. It is thus apparent that the fresh oil of the system is brought into contact with the nearly spent acid. The acid and sludge settling to the bottom of the treating vessel 33 is continuously drawn off through line 54 from which part of the acid is recirculated through line 55 and pump 31 back into the treating vessel 33 and the remainder is discharged from the system through the heat exchanger 44 by means of the line 57. This apparatus is arranged particularly to substantially provide a continuous substantial counter-flow treatment. The cooling coils 59 provide multiple stage absorption of the heat of reaction and the refrigerator 30 pre-cools the untreated oil to a desired initial temperature. The amount of heat absorbed by any or all of the cooling coils 59 and the initial temperature of the untreated oil as determined by the refrigerator 30, may vary in accordance with the conditions of the particular operation to control the maximum treating or reaction temperature within the desired limit.

Figure 5:
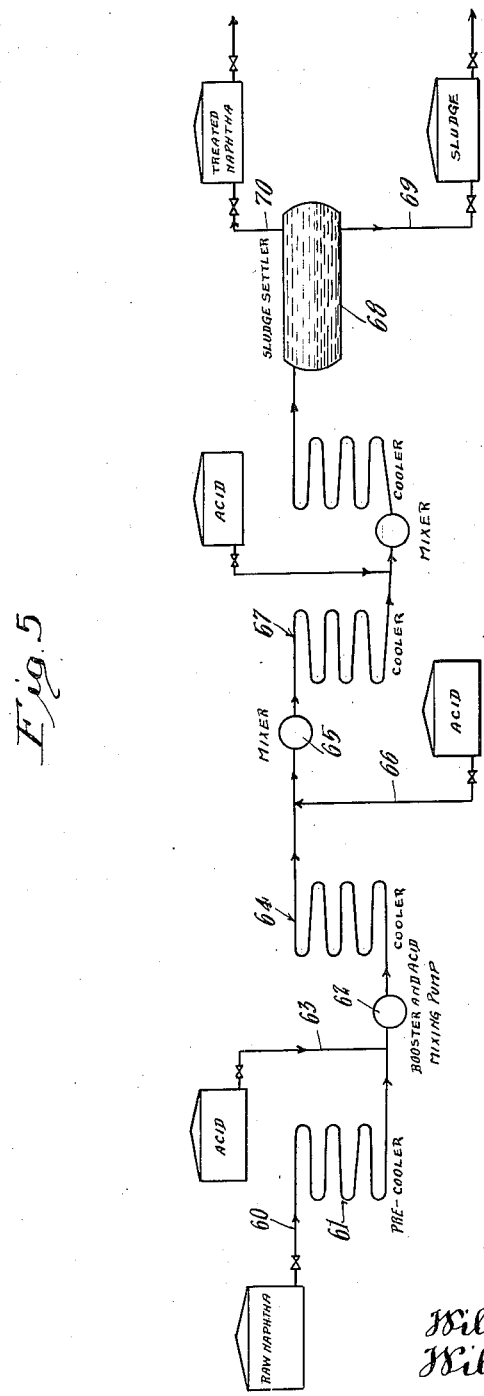
Fig. 5 is a diagrammatical view of an apparatus suitable for conducting an acid treatment in accordance with our invention by splitting the total acid and cooling requirements into several separate steps.

Referring to Fig. 5 of the drawings, the untreated oil passes by an inlet 60 through a pre-cooler 61 and is mixed by a pump 62 with acid received through the line 63. The mixture of oil and the first increment of acid passes from the pump 62 through a cooler 64 and to a pump 65 where it is mixed with another increment of acid introduced through a line 66. The mixture of oil and acid including the additional increment of acid passes from the pump 65 to a further reaction cooler 67 and eventually to a settling chamber 68. The apparatus is susceptible of extension to provide for the addition of acid in any desired increments and for the cooling of the mixture during the reaction following the addition of each increment of acid. The sludge is discharged from the settling chamber 68 through a line 69 and the treated oil through a line 70. This arrangement is intended primarily for use with oils requiring heavy acid treatments with the consequent evolution of considerable heat. This operation permits the desired maximum treating or reaction temperature to be maintained either with or without a reduction of the initial temperature of the untreated oil prior to the addition of the acid, and the absorption of the heat of reaction to be extended by stages so as to reduce the cost of refrigeration or cooling.

Figure 6:
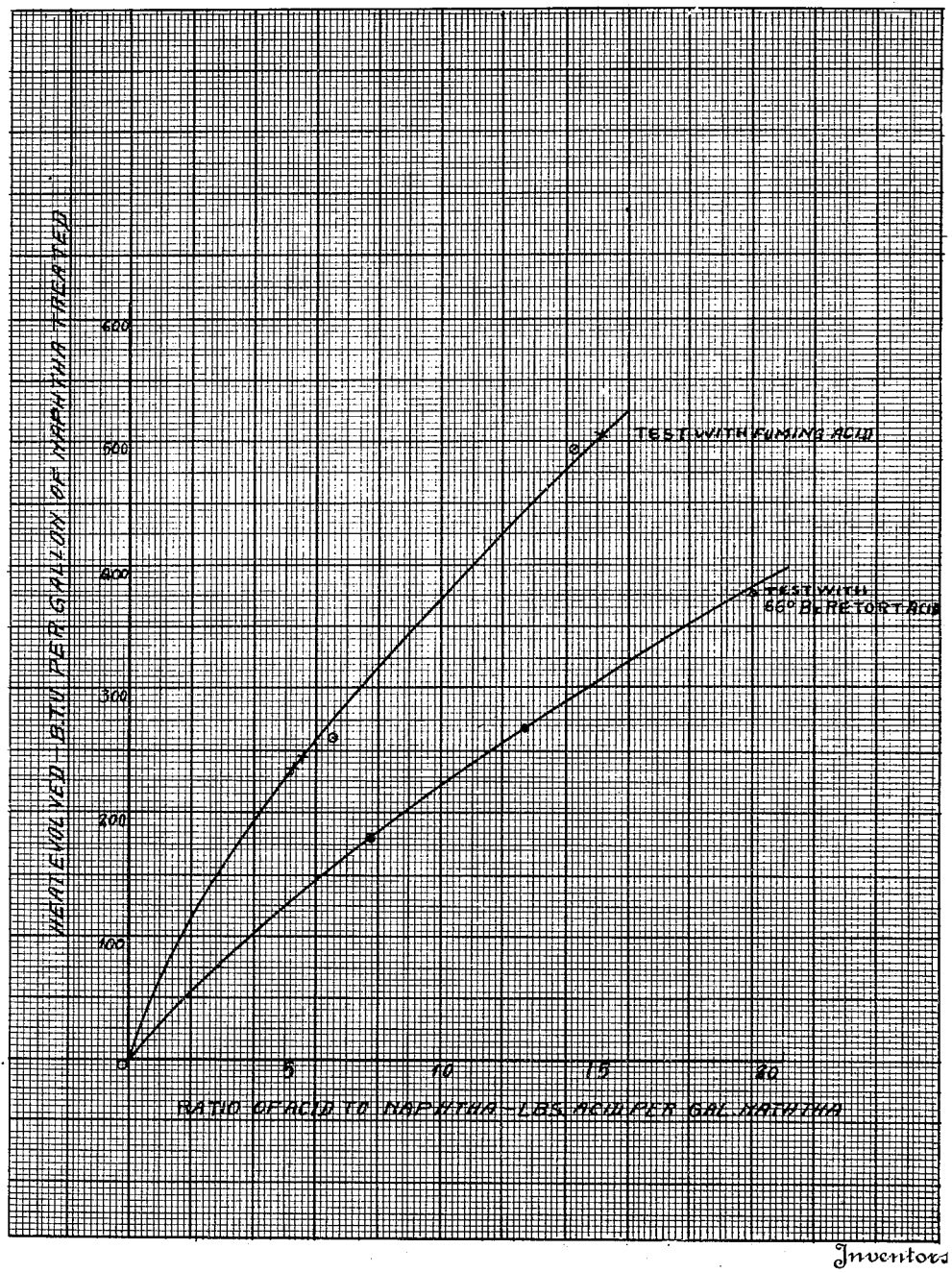
Fig. 6 is a chart showing the heat evolved in the action of sulphuric acid in the treatment of cracked naphtha with increasing quantities of both 15% fuming acid and 66° Baumé acid.

Fig. 6 of the drawings presents curves representing tests with 15% fuming acid and 66° Baumé acid, respectively, showing the heat of reaction with increased quantities of the acid per gallon of oil treated. It will be observed that as the amount of acid is increased the amount of heat evolved is increased in a substantially like proportion, therefore oils having high sulphur content and requiring heavy acid treatments will experience very high temperature rises unless some means is employed for absorbing heat from the reaction. Less heat is evolved for a given quantity of 66° Baumé acid than for a like amount of 15% fuming acid in treating the same oil, but to accomplish the same sulphur reduction a greater quantity of 66° Baumé acid must be used than 15% fuming acid.

Figure 7:
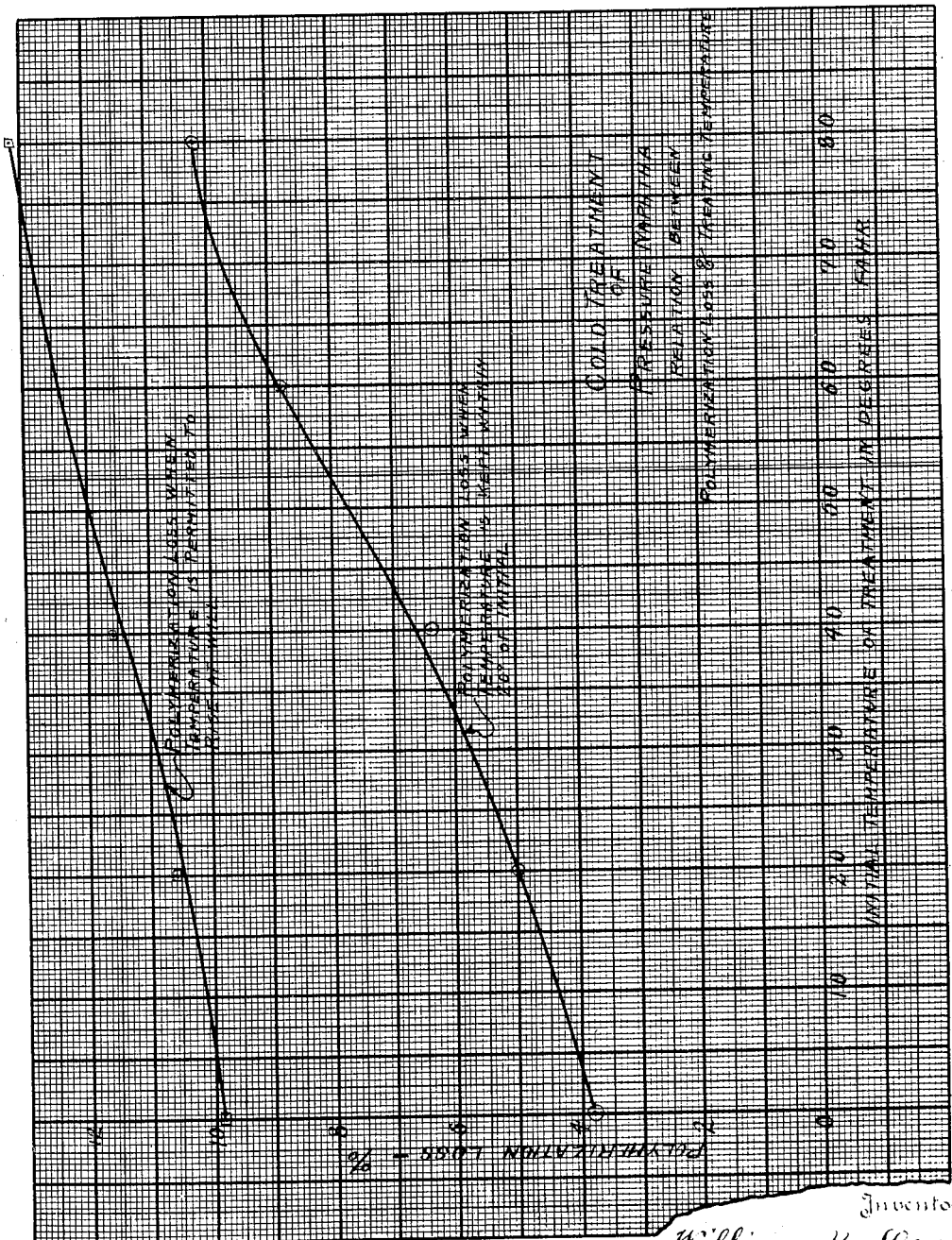
Fig. 7 is a chart showing the relation between the polymerization loss and treating temperature when the reaction temperature is permitted to rise at will and when the reaction temperature is kept within 20° F. of the initial temperature.

Referring to Fig. 7, the chart shows the difference between the polymerization loss encountered when no heat is absorbed from the reaction and when sufficient heat is absorbed to keep the final treating or reaction temperature within 20° of the initial temperature, other conditions remaining constant. It will be observed that the employment of a reduced initial temperature will result in some saving in polymerization loss even though no attempt is made to absorb heat from the reaction, and that this saving increases as the initial temperature is reduced, but that a very substantial saving is accomplished by absorbing heat during the reaction to limit the rise in temperature occasioned by the heat of reaction. The advantage of absorbing heat from the reaction to restrain the rise in temperature during the reaction exists in spite of the initial temperature employed. It is also apparent that a reduction in polymerization loss may be most effectively accomplished by employing a reduced initial temperature in combination with the absorption of heat from the reaction. For example, the use of a reduced initial temperature of approximately 40° F. without absorbing any heat of reaction will enable a reduction in the polymerization loss, from a loss of about 13% at normal conventional treating temperatures, to about 11½% as compared with a loss of about 6½% if the same reduced initial temperature had been employed and heat absorbed from the reaction to limit the maximum treating or reaction temperature to not more than a 20° F. rise (held below 60° F.). On the other hand to obtain a 6½% loss solely through the medium of employing a reduced initial temperature for the untreated oil, and without absorbing any heat from the reaction, it would have been necessary to have cooled the untreated oil to an initial temperature of about −50°–60° F., a very costly procedure.

Figure 8:
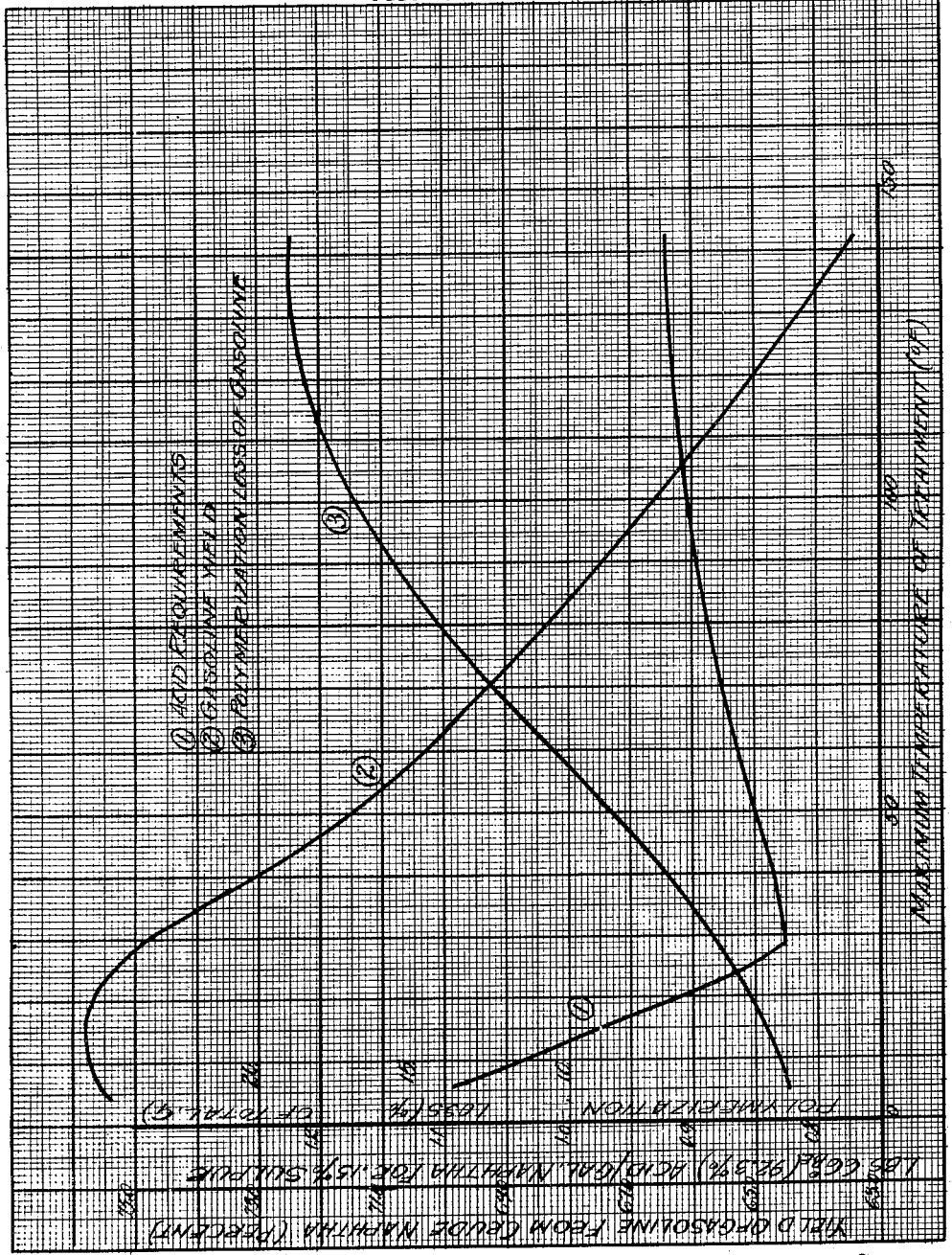
Fig. 8 is a chart illustrating the effect on acid requirements and gasoline yields of limiting the maximum treating or reaction temperature during the production of .15% sulphur gasoline employing 66° Baumé acid.

In Fig. 8 of the drawings curve No. 1 shows the amounts of 66° Baumé acid required at different maximum treating or reaction temperatures to reduce the sulphur content of a given cracked naphtha to .15% sulphur. It will be noted that as the maximum temperature decreases from 140° F. to 28° F., the amount of acid also decreases but increases again as the temperature goes below 28° F. This increases in acid requirements at temperatures below 28° F. is probably due to the increased viscosity of the acid and naphtha when the freezing point of the acid is approached. The difference in acid requirements over the entire range of maximum treating temperatures is only of secondary importance as compared with the saving in valuable gasoline constituents due to the reduction in the polymerization loss effected by the same corresponding maximum treating temperatures. Curve No. 2 of Fig. 8 of the drawings shows that the gasoline yield increases from about 63½% at a maximum treating temperature of 140° F. to about 75½% at a maximum treating temperature of 5 to 20° F. Curve No. 3 shows that the gasoline loss due to polymerization, decreases from about 19% at a maximum temperature of 140° F. to about 3½% at a maximum temperature of 5° F. While these curves show that the optimum maximum treating temperature for maximum gasoline yield from a particular naphtha using 66° Baumé acid is from 15°–20° F., the optimum maximum temperature of treatment for minimum acid requirements is between 25 to 30° F. The true optimum maximum temperature for minimum cost of treatment lies between 5° F. and 40° F. and is determined by the balance between the cost of acid saving in gasoline and cost of refrigeration.

Figure 9:
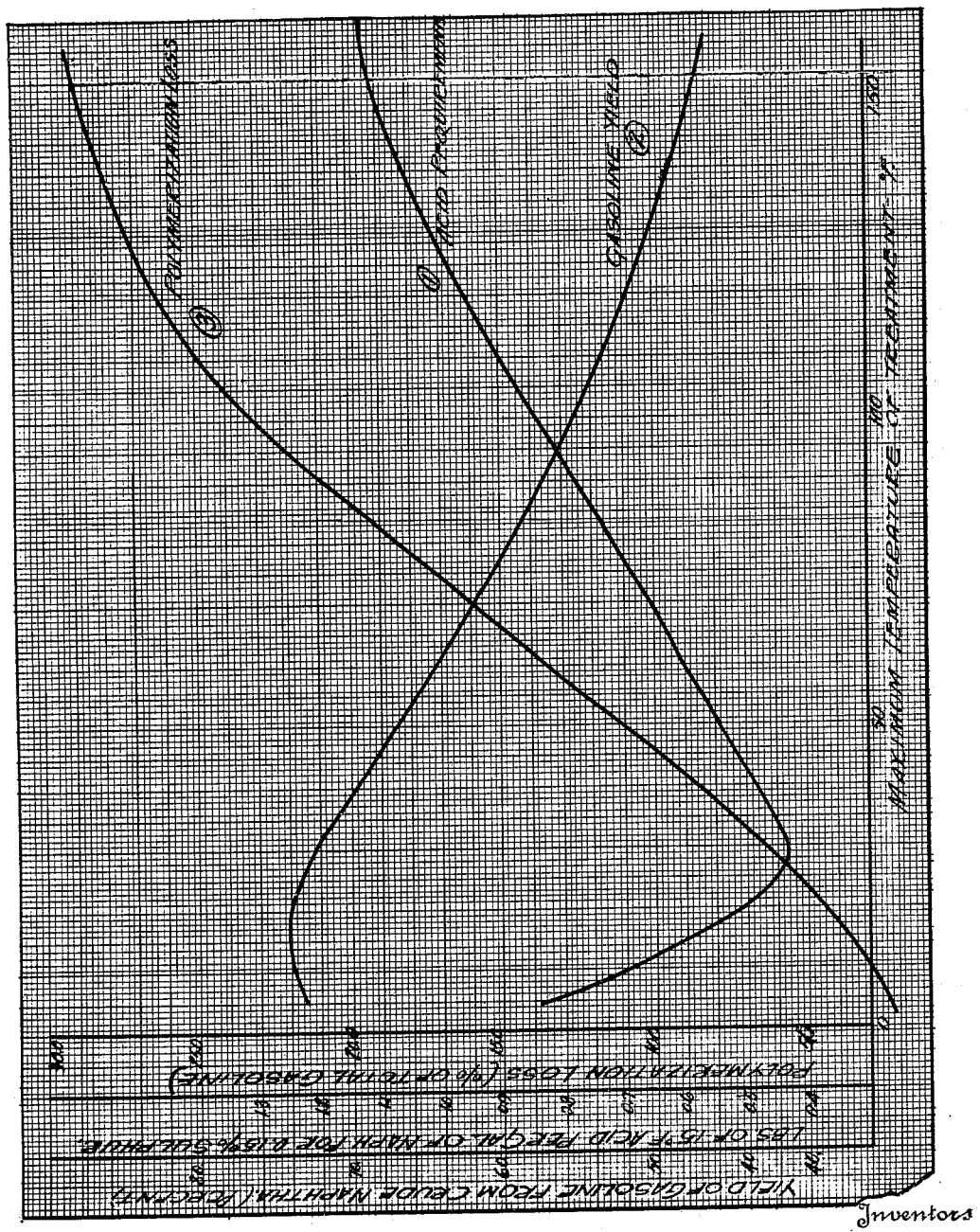
Fig. 9 is a chart illustrating the effect on acid requirements and gasoline yields of limiting the maximum treating or reaction temperature during the production of .15% sulphur gasoline employing 15% fuming acid.

The curves embodied in the chart constituting Fig. 9 of the drawings correspond to the curves embodied in Fig. 8 of the drawings except that they refer to the use of 15% fuming acid in lieu of 66° Baumé acid.

It will be understood from the foregoing description of our invention that the particular maximum treating or reaction temperature to be employed or maintained in any given case will depend upon the conditions attending the particular treatment. The optimum maximum treating or reaction temperature for effecting a given saving in polymerization loss will vary in accordance with the sulphur content of the oil to be treated and the strength of acid employed. The relative cost of cooling and value of valuable gasoline constituents saved by reducing the polymerization loss will likewise influence the selection of the optimum maximum treating or reaction temperature to be employed and maintained in any given case.

The following tabulation further illustrates the practice of our invention and the results obtained thereby under various conditions. We have obtained the results embodied in such tabulation by treating a given cracked naphtha with a 66° F. acid in different amounts and at different maximum treating or reaction temperatures as indicated in the tabulation as follows:

Treatment of crude pressure naphtha at various maximum temperatures with different acid amounts

| Test Number | 1 | | | 2 | | | 3 | | |
|---|---|---|---|---|---|---|---|---|---|
| Treatment—Temperature | 0°–5° F. | | | 15–20° F. | | | 25–30° F. | | |
| Pounds 66° acid 1 gallon | 0.75 | 1.00 | 1.25 | 0.75 | 1.00 | 1.25 | 0.75 | 1.00 | 1.25 |
| Crude naphtha | | | | | | | | | |
| Gravity A. P. I. | 52.5 | | | 52.5 | | | 52.5 | | |
| Per cent sulphur | .78 | | | .78 | | | .78 | | |
| Per cent gasoline | 88.6 | | | 88.6 | | | 88.6 | | |

*Treatment of crude pressure naphtha at various maximum temperatures with different acid amounts*—Continued

| Test Number | 1 | | | 2 | | | 3 | | |
|---|---|---|---|---|---|---|---|---|---|
| Treatment—Temperature | 0°–5° F. | | | 15–20° F. | | | 25–30° F. | | |
| Treated naphtha | | | | | | | | | |
| Gravity A. P. I | 51.7 | 51.3 | 51.2 | 50.7 | 50.8 | 50.4 | 50.1 | 50.0 | 49.9 |
| Per cent sulphur | .43 | .36 | .28 | .45 | .35 | .295 | .47 | .40 | .35 |
| Per cent gasoline | 86.1 | 86.0 | 85.7 | 85.3 | 84.1 | 83.2 | 84.3 | 82.2 | 81.1 |
| Gasoline | | | | | | | | | |
| Gravity A. P. I | 56.4 | 56.1 | 56.1 | 55.9 | 56.0 | 56.3 | 55.5 | 56.2 | 56.4 |
| Per cent sulphur | .265 | .177 | .116 | .209 | .127 | 1083 | .183 | .115 | .081 |
| A. S. T. M. Start | 100 | 101 | 102 | 107 | 108 | 107 | 111 | 108 | 102 |
| 20 per cent | 194 | 195 | 195 | 201 | 204 | 202 | 205 | 205 | 202 |
| 50 per cent | 269 | 270 | 273 | 271 | 275 | 275 | 275 | 276 | 278 |
| 90 per cent | 370 | 373 | 375 | 376 | 372 | 380 | 376 | 376 | 377 |
| End point | 437 | 437 | 437 | 437 | 437 | 437 | 437 | 437 | 437 |
| Yields | | | | | | | | | |
| Acid treatment | 91.12 | 89.04 | 86.96 | 90.51 | 88.76 | 86.52 | 90.25 | 88.56 | 87.45 |
| Steam still | 80.0 | 77.8 | 77.2 | 78.0 | 76.5 | 75.5 | 77.5 | 75.3 | 76.0 |
| Polymerization loss | 2.82 | 2.94 | 3.28 | 3.72 | 5.08 | 6.09 | 4.86 | 7.23 | 8.47 |

| Test Number | 4 | | | 5 | | | 6 | | |
|---|---|---|---|---|---|---|---|---|---|
| Treatment—Temperature | 39–45° F. | | | 54–61° F. | | | (Normal—No cooling) 122–142° F. | | |
| Pounds 66° acid 1 gallon | 0.75 | 1.00 | 1.25 | 0.75 | 1.00 | 1.25 | 0.75 | 1.00 | 1.25 |
| Crude naphtha | | | | | | | | | |
| Gravity A. P. I | 52.5 | | | 52.5 | | | 52.5 | | |
| Per cent sulphur | .78 | | | .78 | | | .78 | | |
| Per cent gasoline | 88.6 | | | 88.6 | | | 88.6 | | |
| Treated naphtha | | | | | | | | | |
| Gravity A. P. I | 49.6 | 49.0 | 48.5 | 48.7 | 48.1 | 47.8 | 47.8 | 47.0 | 46.6 |
| Per cent sulphur | .55 | .49 | .48 | .64 | .60 | .58 | .79 | .78 | .81 |
| Per cent gasoline | 82.7 | 80.2 | 78.9 | 80.7 | 77.1 | 74.2 | 75.2 | 70.5 | 67.0 |
| Gasoline | | | | | | | | | |
| Gravity A. P. I | 56.4 | 56.3 | 56.8 | 56.0 | 56.8 | 56.5 | 56.3 | 56.3 | 57.9 |
| Per cent sulphur | .18 | .12 | .091 | .180 | .125 | .099 | .196 | .132 | .102 |
| A. S. T. M. Start | 105 | 110 | 117 | 105 | 109 | 109 | 112 | 113 | 112 |
| 20 per cent | 198 | 206 | 205 | 206 | 206 | 209 | 209 | 210 | 205 |
| 50 per cent | 273 | 276 | 276 | 275 | 276 | 275 | 278 | 279 | 271 |
| 90 per cent | 378 | 377 | 376 | 367 | 379 | 375 | 374 | 388 | 362 |
| End point | 437 | 437 | 437 | 437 | 437 | 437 | 437 | 437 | 437 |
| Yields | | | | | | | | | |
| Acid treatment | 89.20 | 87.52 | 86.52 | 90.20 | 88.01 | 86.80 | 89.58 | 87.80 | 86.54 |
| Steam still | 75.7 | 74.5 | 72.0 | 72.0 | 68.7 | 67.0 | 69.2 | 67.0 | 61.0 |
| Polymerization loss | 6.66 | 9.48 | 10.95 | 8.91 | 12.97 | 16.24 | 15.11 | 20.65 | 24.37 |

To illustrate the practice of our invention in producing finished gasoline of given sulphur specifications (.15%) from a series of cracked naphthas of different gravities and sulphur contents we have made the following tabulation from actual operations conducted by us.

*Comparison of treatment with 66° acid at normal and reduced temperatures. Results of nine tests*

| Test number | 1 | | 2 | | 3 | | 4 | | 5 | | 6 | | 7 | | 8 | | 9 | |
|---|---|---|---|---|---|---|---|---|---|---|---|---|---|---|---|---|---|---|
| 1. Crude naphtha | | | | | | | | | | | | | | | | | | |
| Gravity | 47.6 | | 49.6 | | 50.8 | | 52.3 | | 55.2 | | 52.5 | | 53.2 | | 53.1 | | 52.9 | |
| Per cent sulphur | .60 | | .51 | | .51 | | .52 | | .71 | | .53 | | .57 | | .74 | | .75 | |
| Per cent crude gasoline | 78.0 | | 84.7 | | 86.0 | | 89.0 | | 92.3 | | 93.1 | | 91.3 | | 86.8 | | 91.7 | |
| 2. Treatment | Reg. | *Cold | Reg. | Cold | Reg. | Cold | Reg. | Cold | Reg. | Cold | Reg. | Cold | Reg. | Cold | Reg. | Cold | Reg. | Cold |
| 3. Pounds 66° Bé. acid per gallon of naphtha | .59 | .575 | .66 | .61 | 1.00 | .64 | .96 | .605 | 1.49 | 1.12 | .50 | .46 | .85 | .68 | 1.06 | .80 | 1.25 | .925 |
| 4. Yield of acid treated naphtha | 91.8 | 93.2 | 88.2 | 93.6 | 85.3 | 92.7 | 85.3 | 94.0 | 81.1 | 88.7 | 90.5 | 94.6 | 86.9 | 92.7 | 84.8 | 91.6 | 82.8 | 90.3 |
| Gravity | 45.8 | 47.2 | 47.0 | 48.8 | 47.1 | 49.6 | 48.1 | 50.9 | 49.2 | 53.1 | 48.7 | 51.1 | 49.5 | 52.4 | 47.8 | 52.0 | 48.2 | 52.2 |
| Per cent sulphur | .62 | .335 | .53 | .31 | .54 | .27 | .54 | .27 | .80 | .34 | .55 | .29 | .62 | .32 | .68 | .345 | .83 | .38 |
| Per cent gasoline | 66.4 | 74.9 | 72.1 | 80.6 | 73.7 | 84.0 | 76.5 | 86.6 | 75.6 | 87.5 | 79.8 | 88.0 | 76.0 | 86.7 | 69.0 | 82.0 | 72.3 | 88.6 |
| 5. Yield of gasoline from steam still | 64.4 | 72.9 | 70.1 | 78.6 | 71.7 | 82.0 | 74.5 | 84.6 | 71.5 | 95.4 | 74.5 | 84.7 | 73.3 | 84.2 | 66.5 | 78.0 | 69.5 | 80.7 |
| Gravity | 54.2 | 53.4 | 54.0 | 53.7 | 53.8 | 53.8 | 55.5 | 54.9 | 57.3 | 57.4 | 54.8 | 53.6 | 56.1 | 55.1 | 56.8 | 56.2 | 56.9 | 56.7 |
| Per cent sulphur | .15 | .15 | .15 | .15 | .15 | .15 | .15 | .15 | .15 | .15 | .15 | .15 | .15 | .15 | .15 | .15 | .15 | .15 |
| 6. Polymerization loss. Per cent gasoline crude naphtha—Per cent Gasoline | | | | | | | | | | | | | | | | | | |
| Gasoline treated naphtha Crude Naphtha | 14.9 | 4.0 | 14.9 | 4.8 | 14.3 | 2.3 | 14.1 | 2.7 | 18.1 | 7.4 | 13.5 | 4.7 | 15.0 | 3.1 | 19.8 | 4.65 | 21.0 | 3.2 |
| 7. Gasoline yield from crude naphtha | 59.1 | 67.9 | 61.8 | 73.5 | 61.2 | 76.0 | 63.6 | 79.5 | 58.0 | 75.6 | 67.4 | 80.1 | 63.6 | 78.1 | 56.4 | 71.4 | 57.6 | 72.8 |

*15° to 25° F. ("Cold").

We have employed the terms "non-sulphur-bearing bodies" herein to designate desirable motor fuel constituents as distinguished from constituents commonly regarded as "sulphur bearing", the reduction of which is sought to limit the sulphur content of the finished fuel. It is not certain that the desirable motor fuel constituents which we term "non-sulphur bearing bodies" are entirely free from sulphur, and in employing this term, we use it in its ordinary sense in the industry to mean those constituents free or so free of sulphur as to be valuable motor fuel constituents.

The particular examples that have been referred to in describing our invention are intended as illustrative only, and the application of our invention is not limited to the particulars of any of said examples nor to the use of the various arrangements of the apparatus referred to, and is of the full scope set forth in the following claims.

We claim:

1. A sulphur removing process of treating motor fuels containing sulphur bearing bodies and non-sulphur bearing unsaturated hydrocarbons, in which a part of the sulphur bearing bodies are removed by a selective action of sulphuric acid and a part of the sulphur bearing bodies polymerized while excessive polymerization of the unsaturated hydrocarbons is prevented, which comprises contacting such motor fuel with sulphuric acid of such strength and quantity as to have the capacity at low temperatures of selectively removing a part of the sulphur bodies and to polymerize a further part of said bodies and to effect a material rise of temperature of reaction unless restrained, conducting the treatment between the motor fuel and acid, by absorbing heat of reaction, at a maximum temperature of treatment sufficiently low to permit a part of the sulphur bodies to be selectively removed by said acid and a part thereof to be polymerized and below the temperature at which the non-sulphur bearing unsaturated hydrocarbons readily polymerize, separating the motor fuel from the acid, and distilling the motor fuel from the polymerized bodies.

2. A sulphur removing process of treating motor fuels containing sulphur bearing bodies and non-sulphur bearing unsaturated hydrocarbons, in which selective action of sulphuric acid on the sulphur bearing bodies is depended upon while polymerization of the unsaturated hydrocarbons is held to a minimum and consequent excessive loss of unsaturated hydrocarbons from the fuel undergoing treatment is avoided, which includes contacting such motor fuel with sulphuric acid of such strength and quantity as to have the capacity at low temperatures of selectively removing a part of the sulphur bodies and to effect a material rise of temperature of reaction unless restrained, and absorbing heat of reaction during treatment to maintain a maximum temperature of treatment sufficiently low to permit a part of the sulphur bearing bodies to be selectively removed by said acid and below the temperature at which the non-sulphur bearing unsaturated hydrocarbons readily polymerize, whereby such selective action is secured coincident with the control of such polymerization.

3. A sulphur removing process of treating cracked naphthas of the gasoline type containing non-sulphur bearing unsaturated hydrocarbons and sulphur bearing bodies in which selective action of sulphuric acid of a strength not substantially less than 66° Baumé on the sulphur bearing bodies is depended upon, while excessive polymerization of the unsaturated hydrocarbons is prevented and consequent excessive loss of unsaturated hydrocarbons from the fuel undergoing treatment is avoided, which includes conducting such treatment under such temperature conditions as to limit the temperature of the reacting acid and fuel to a temperature at which the sulphur bearing bodies are selectively removable in the acid and below a temperature at which non-sulphur bearing bodies readily polymerize, whereby such selective action is secured coincident with the control of such polymerization.

4. A sulphur removing process of treating motor fuels containing sulphur bearing bodies and non-sulphur bearing unsaturated hydrocarbons, which comprises contacting such motor fuel with sulphuric acid of such strength and quantity as to have the capacity at low temperatures, of selectively removing a part of the sulphur bodies and to polymerize a further part of said bodies and to effect a material rise of temperature of reaction unless restrained, and conducting the treatment with a maximum reaction temperature within a range of temperature between 5 and 40° F.

5. A sulphur removing process of treating motor fuels containing sulphur bearing bodies and non-sulphur bearing unsaturated hydrocarbons, which comprises contacting such motor fuel with sulphuric acid of such strength and quantity as to have the capacity at low temperatures, of selectively removing a part of the sulphur bearing bodies and to polymerize a further part of said bodies and to effect a material rise of temperature of reaction unless restrained, and maintaining the maximum temperature of reaction sufficiently low that a part of the sulphur bearing bodies are selectively removed by said acid and a part thereof polymerized and below the temperature at which the non-sulphur bearing unsaturated hydrocarbons readily polymerize, separating motor fuel from the acid and distilling the motor fuel from the polymerized bodies.

6. A sulphur removing process of treating motor fuels containing sulphur bearing bodies and non-sulphur bearing unsaturated hydrocarbons, which comprises pre-cooling the motor fuels, contacting such motor fuels with sulphuric acid of such strength and quantity as to have the capacity at low temperatures, of selectively removing a part of the sulphur bearing bodies and to polymerize a further part of said bodies and to effect a material rise of temperature of reaction unless restrained, and absorbing heat from the admixture of fuel and acid during reaction to maintain the maximum temperature of reaction sufficiently low that a part of the sulphur bearing bodies are selectively removed by said acid and a part thereof polymerized and below the temperature at which the non-sulphur bearing unsaturated hydrocarbons readily polymerize, separating the motor fuel from the acid, and distilling the motor fuel from the polymerized bodies.

7. A sulphur removing process of treating motor fuels containing sulphur bearing bodies and non-sulphur bearing unsaturated hydrocarbons, which comprises adding sulphuric acid to the fuel in increments, such sulphuric acid being of such strength and quantity as to have the capacity at low temperatures of selectively removing a part of the sulphur bearing bodies and to polymerize a further part of said bodies and to effect a material rise of temperature of reaction unless restrained, and maintaining the maximum temperature of reaction sufficiently low that a part of the sulphur bearing bodies are selectively removed by said acid and a part thereof polymerized and below the temperature at which the non-sulphur bearing unsaturated hydrocarbons readily polymerize, separating the motor fuel from the acid, and distilling the motor fuel from the polymerized bodies.

8. A sulphur removing process of treating motor fuels containing sulphur bearing bodies and non-sulphur bearing unsaturated hydrocarbons, which comprises pre-cooling the motor fuels, adding sulphuric acid to the fuel in increments, such sulphuric acid being of such strength and quantity as to have the capacity at low temperatures of selectively removing a part of the sulphur bearing bodies and to polymerize a further part of said bodies and to effect a material rise of temperature of reaction unless restrained, and absorbing sufficient heat from the admixture of fuel and acid during reaction to maintain the maximum temperature of reaction sufficiently low that a part of the sulphur bearing bodies are selectively removed by said acid and a part thereof polymerized and below the temperature at which the non-sulphur bearing unsaturated hydrocarbons readily polymerize, separating the motor fuel from the acid, and distilling the motor fuel from the polymerized bodies.

9. A process of treating cracked gasoline stocks containing relatively high percentages of substantially non-sulphur bearing unsaturated hydrocarbons and sulphur bearing bodies in which selective action of sulphuric acid of a strength not substantially less than 66° Baumé on the sulphur bearing bodies is depended upon, while excessive polymerization of the unsaturated hydrocarbons is prevented and consequent excessive loss of unsaturated hydrocarbons from the fuel undergoing treatment is avoided, which includes conducting such treatment under such temperature conditions as to limit the temperature of the reacting acid and fuel to a temperature at which the sulphur bearing bodies are selectively removable in the acid and below a temperature at which non-sulphur bearing bodies readily polymerize, whereby such selective action is secured coincident with the control of such polymerization.

10. A process of treating cracked gasoline stocks containing at least 20% of substantially non-sulphur bearing unsaturated hydrocarbons and sulphur bearing bodies in which selective action of sulphuric acid of a strength not substantially less than 66° Baumé on the sulphur bearing bodies is depended upon, while excessive polymerization of the unsaturated hydrocarbons is prevented and consequent excessive loss of unsaturated hydrocarbons from the fuel undergoing treatment is avoided, which includes conducting such treatment under such temperature conditions as to limit the temperature of the reacting acid and fuel to a temperature at which the sulphur bearing bodies are selectively removable in the acid and below a temperature at which non-sulphur bearing bodies readily ploymerize, whereby such selective action is secured coincident with the control of such polymerization.

11. A process of treating cracked gasoline stocks containing sulphur bearing bodies and a relatively high percentage of substantially non-sulphur bearing unsaturated hydrocarbons, to retain mainly unaffected the unsaturates thereof while substantially removing the sulphur bearing bodies in which selective action of sulphuric acid of a strength not substantially less than 66° Baumé on the sulphur bearing bodies is depended upon, while excessive polymerization of the unsaturated hydrocarbons is prevented and consequent excessive loss of unsaturated hydrocarbons from the fuel undergoing treatment is avoided, which includes conducting such treatment under such temperature conditions as to limit the temperature of the reacting acid and fuel to a temperature at which the sulphur bearing bodies are selectively removable in the acid and below a temperature at which non-sulphur bearing bodies readily polymerize, whereby such selective action is secured coincident with the control of such polymerization.

Signed at Contra Costa, California, this 22nd day of November, 1927.

WILLIAM N. DAVIS.
WILLIAM H. HAMPTON.